Dec. 9, 1924.
W. P. McGRAW
CANDY CURLING MACHINE
Filed Sept. 27, 1922    3 Sheets-Sheet 1
1,518,805
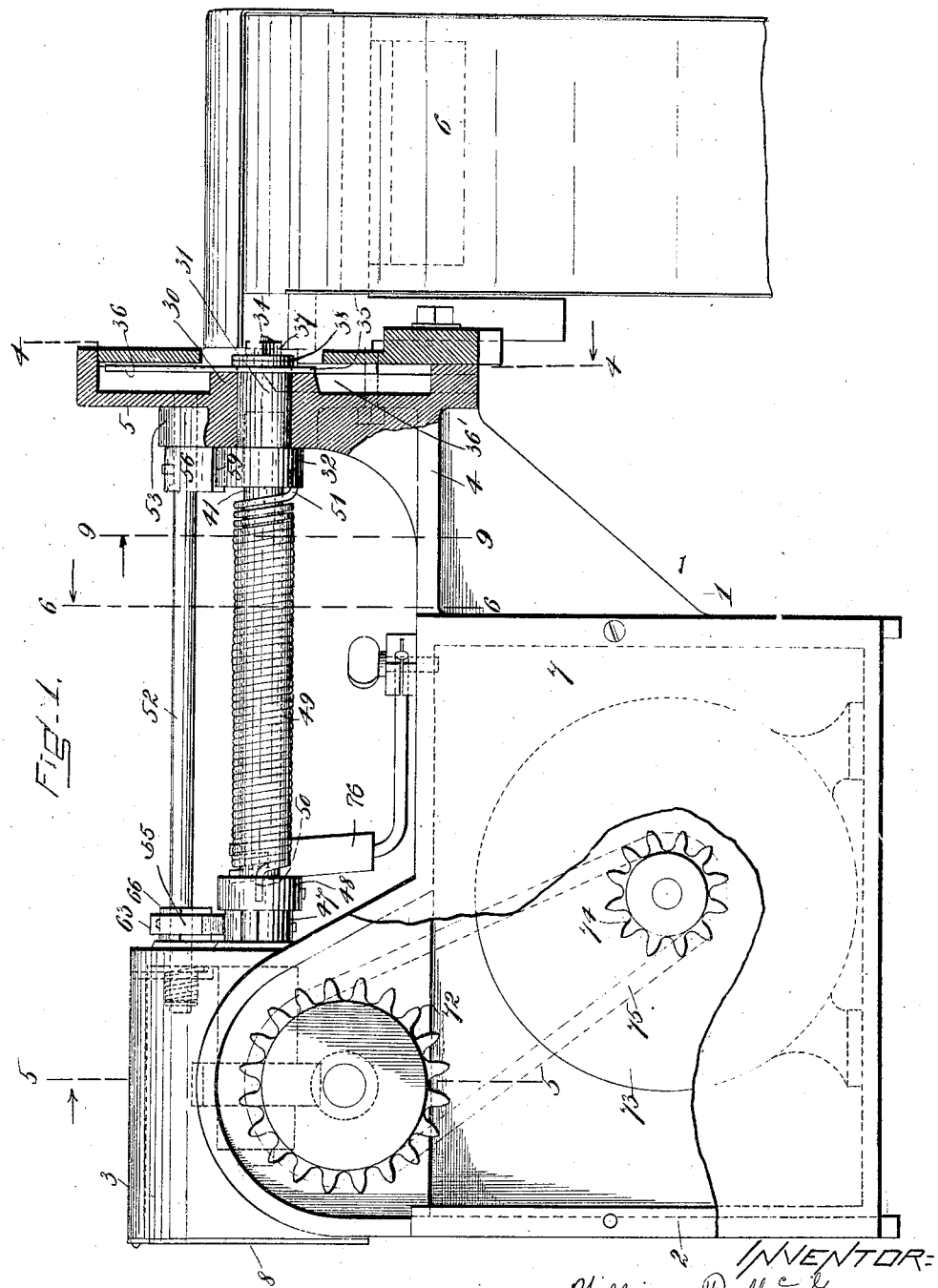
INVENTOR:
William P. McGraw
By Cval + Hayes
ATTORNEYS

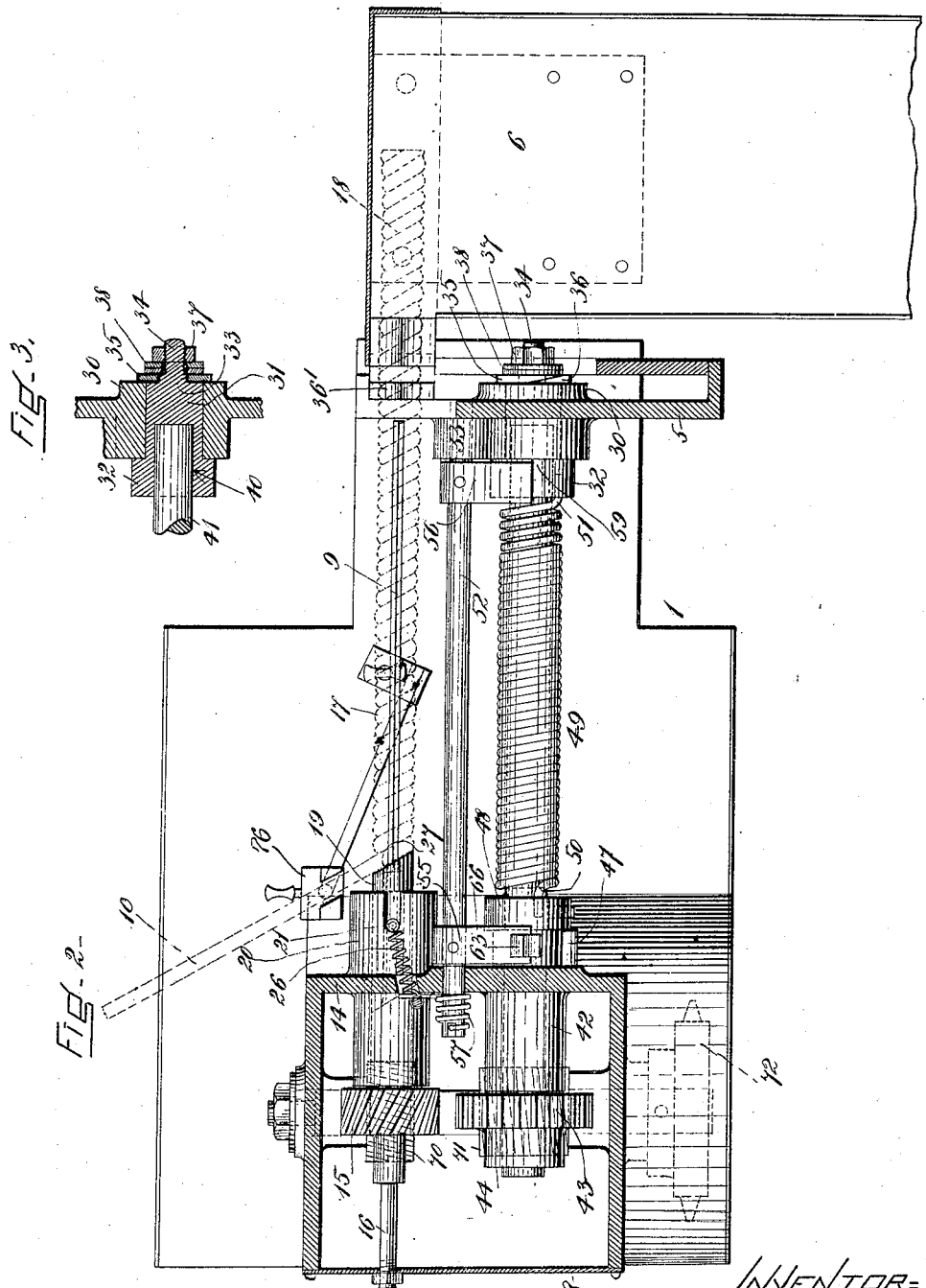

Dec. 9, 1924. 1,518,805
W. P. McGRAW
CANDY CURLING MACHINE
Filed Sept. 27, 1922 3 Sheets-Sheet 3
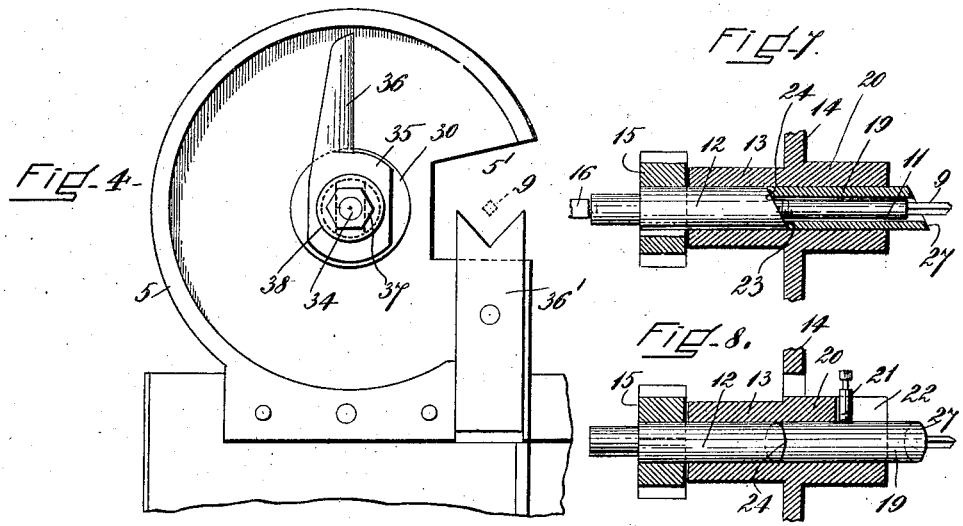
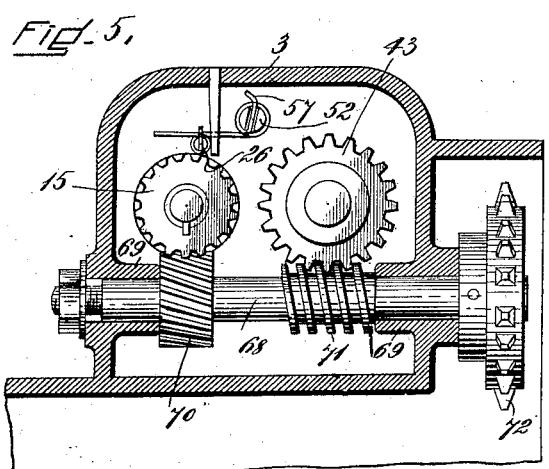
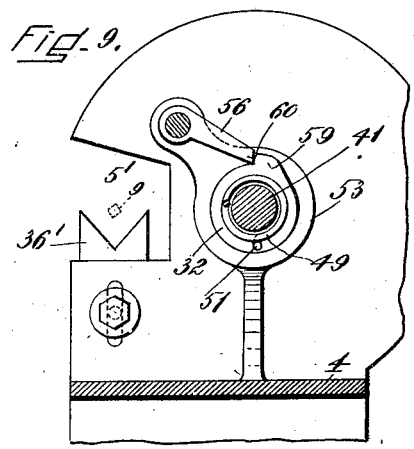
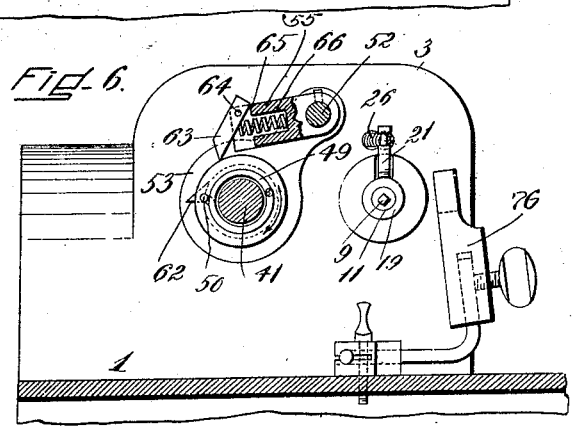
INVENTOR=
William P. McGraw
By
ATTORNEYS=

Patented Dec. 9, 1924.

1,518,805

UNITED STATES PATENT OFFICE.

WILLIAM P. McGRAW, OF BOSTON, MASSACHUSETTS, ASSIGNOR TO NOBLE JACKSON COMPANY, OF BOSTON, MASSACHUSETTS, A CORPORATION OF MASSACHUSETTS.

CANDY-CURLING MACHINE.

Application filed September 27, 1922. Serial No. 590,984.

*To all whom it may concern:*

Be it known that I, WILLIAM P. McGRAW, of Boston, in the county of Suffolk and State of Massachusetts, a citizen of the United States, have invented a new and useful Improvement in Candy-Curling Machines, of which the following is a full, clear, and exact description, reference being had to the accompanying drawings, forming a part of this specification, in explaining its nature.

The present invention relates to a machine for curling candy of ribbon form and for cutting the candy after being curled into pieces.

The object of my invention is to provide a simple, quick-acting and powerful machine that will operate at all times with absolute precision.

The invention can best be seen and understood by reference to the drawings, in which—

Figure 1 is a side elevation of the machine.

Fig. 2 is a plan.

Fig. 3 is a cross section of a detail of construction.

Fig. 4 is an end elevation of a portion of the machine.

Fig. 5 is a section on the line 5—5 of Fig. 1.

Fig. 6 is a section on the line 6—6 of Fig. 1.

Figs. 7 and 8 are sections of further details of construction, and

Fig. 9 is a section on the line 9—9 of Fig. 1.

Referring to the drawings:—

1 represents the frame of the machine. The frame comprises a body section 2, a head 3 superposed thereon and an extension 4 forward of the body section carrying a footpiece 5 arranged at the end of the machine opposite the head. Beyond the footpiece is an inclined chute 6. The body section 2 and head 3 are made as casings or housings and contain various parts of the driving mechanism, which are thus entirely enclosed. Access is had to the interior or chamber of the body section 2 through its side normally closed by an attached plate 7. Access is had to the interior or chamber of the head 3 from its rear end, which is normally closed by an attached plate 8.

9 represents the winding spindle or that upon which the candy ribbon or work 10 is coiled. This spindle is preferably rectangular in cross section. The spindle is provided with a cylindrical shank 11 threaded into a stub shaft 12 from which the spindle extends. The spindle is turned by rotation of this shaft which turns within a hub 13 on the rear side of a plate 14 at the forward end of the head 3. The shaft 13 carries a gear 15 through which the shaft is turned. This gear butts against the end of the hub 13, thereby limiting the endwise movement of the shaft in a forward direction. A reverse endwise movement of the shaft is prevented by a post 16 attached to the cover plate 8 at the rear end of the head 3, the post 16 being brought into contact with the end of the shaft 12 preventing its lateral displacement upon the attachment of the plate 8 to the head.

The spindle 9 preferably extends to a point just short of the footpiece 5 and is of sufficient length to permit of a curl 17 of some length being formed thereon as the spindle is turned. In the operation of forming the curl the work 10 is fed continuously onto the spindle to curl thereon, and it is necessary to progressively move the curl as it is formed along the spindle in order that a curled end 18 may run off the end of the spindle and be cut therefrom. For the purpose of moving the main body 17 of the curl progressively along the spindle the shank portion 11 of the spindle is provided with a pusher consisting of a sleeve 19. This sleeve is loose upon the shank 11 and lies within a hub or boss 20 on the forward side of the end plate 14 of the head. The sleeve projects at all times beyond the forward end of the boss or hub within which it is contained for engaging the curl on the spindle. The sleeve 19 has a permitted endwise movement upon the shank 11 of the spindle, but is held against rotation. This is effected by a pin 21 secured to the sleeve and projecting upwardly through a slot 22 in the hub 20 (see Fig. 8), along which slot the pin is movable with the endwise movement of the sleeve. The rear end 23 of the sleeve connects with the forward end 24 of the rotary stub shaft 12 to which the shank of the spindle is affixed. Both the ends 23, 24 are beveled or inclined relatively to the axis of the shaft. Consequently as the shaft 12 is turned a reciprocatory endwise movement will be imparted to the sleeve if it be yieldingly held in contact with the end 24 of the shaft (see Figs. 7 and 8). The sleeve is yieldingly held in contact with the shaft by means of a spring 26 fixed to the pin 21 by the sleeve. This spring extends backward through an opening in the plate 14 of the head and the end of the spring is secured by any suitable means of retention to this plate from within the head. As the sleeve is thus reciprocated it will move the curl along the spindle as the curl is formed. In this connection it will be observed by reference to Fig. 1 that the curl is formed upon the spindle at an angle with relation to it and consequently the end 27 of the sleeve, which engages the curl as it forms has the same incline or bevel.

As the curl is formed the end portion 18 which lies beyond the end of the spindle has extension through an opening 5' in the footpiece 5 and runs off a sufficient distance beyond the footpiece to lie within the head of the chute 6 in order that it may pass into and through the chute and thence into any suitable receptacle, when the end piece 18 is severed as is done in the operation of the machine. In other words, during the continuous formation of the curl simultaneously-acting mechanism is provided whereby end pieces 18 of determinate length may be cut off or severed at proper periodic intervals. Reference will now be made to this mechanism.

Arranged to turn within a hub 30 on the footpiece 5 at a point laterally removed from the end of the spindle is a stub shaft 31. This shaft carries on the inner end thereof an annular collar 32 which butts against the end of the hub 30 limiting the endwise movement of the shaft in one direction. At its opposite ends just beyond the outer face of the hub the shaft is provided with a squared shoulder 33 from which projects a contracted cylindrical threaded portion 34 (see Figs. 3 and 4). Arranged upon the squared shoulder 33 is the butt end 35 of a knife 36 which is held in place by means of a lock nut 37 and interposed washers 38 arranged upon the contracted portion of the shaft. The butt end 35 of the knife thus retained bears against the outer face of the hub 30 and prevents endwise displacement of the shaft. The disposition and general arrangement of the knife is such that as the shaft 31 is turned the knife will be brought into wiping contact with and sever the extended portion 18 of the curl just beyond the end of the spindle. In its cutting action the knife is preferably assisted by the cutting edge of a fixed blade 36' over which the portion 18 of the curl extends and which is adjustably secured to the footpiece 5 of the frame.

The stub shaft 31 has within it a socket 40 into which fits the end of a shaft 41 and in this socket the end of the shaft has bearing to turn. The shaft 41 extends in parallel alignment with the spindle through the plate 14 on the front side of the head 3 and is journaled to turn within a hub or boss 42 on the rear side of this plate. The shaft 41 carries on its end a gear 43 through which the shaft is turned. This gear is keyed to the shaft and lies between the end of the hub 42 and a keeper 44 on the end of the shaft for holding the gear in place. Fixed to the shaft 41 just outside the plate 14 of the head are annular collars 47, 48, respectively. The collar 47 has bearing against the side of the plate 14 for preventing endwise displacement of the shaft 41 in one direction. Endwise displacement of the shaft in a reverse direction is prevented by the socketing of the shaft in the stub shaft 40 as explained above.

Loosely arranged upon the shaft 41 is a coil spring 49. One end 50 of this spring is fixed in the collar 48 on the shaft 41 and its opposite end 51 is fixed in the collar 32 on the stub shaft 31 which carries the knife. Arranged parallel to the shaft 41 and preferably disposed between it and the spindle is a shaft 52. This shaft is journaled to turn at one end within the plate 14 on the front side of the head and at its opposite end within a hub 53 on the side of the footpiece 5 of the frame. The shaft 52 has affixed to it fingers 55, 56, respectively. These fingers extend laterally from the shaft, the finger 55 projecting over the collar 47 on the shaft 41 and the finger 56 over the collar 32 on the stub shaft 31. The shaft 52 is under the control of a spring 57 fixed to the end of the shaft extending inside the head. This spring is coiled around the shaft and its end is fixed to the plate 14 in any suitable manner. The spring is under tension and acts through the shaft to hold the fingers 55, 56 in normal yielding contact with the respective collars 47 and 32. The collar 32 has thereon a raised shoulder 59 (see Fig. 9) presenting an edge 60 with which the outer end of the finger 56 has engagement as the shaft 31 is turned. The finger by its engagement with the edge 60 prevents rotation of the shaft 31, but leaves the shaft free to turn when the finger is lifted away from the shoulder. The finger 56 is lifted away from the shoulder by a slight turning of the shaft 52 against the tension of the spring 57. This is effected by means of a projection 62 on the collar 47, which, as the collar is turned by the turning of the shaft 41, operates to lift the finger 55 thereby turning the shaft 52 and lifting into a disengaged position the stop finger 56 (see Fig. 6).

While the finger 55 is lifted by the projection 62 on the collar, this is not accomplished by direct contact between these parts, but preferably through fitting the end of the finger with a pin 63 pivoted to the finger at 64, engaging the finger at point 65 and backed by a spring 66 socketed within the finger. In the operation of the shaft 41 the collar 47 will turn in a clockwise direction as shown in Fig. 6 and the projection 62 will be brought into wiping engagement with the pin 63 for lifting the finger 55. The particular advantage of the pin resides in the fact that if by chance the shaft and collar should have a reverse movement contact between the projection and the finger will be permitted without disruption, the finger being thereby lifted and the pin moved back against the spring 66 contracting it, and this in turn tends to throw the finger off the projection.

Both the gear 15 which operates the spindle and the gear 43 which operates the shaft 41 are operated from off a common shaft 68 which turns within hubs 69 on the head 3 of the machine (see Fig. 5). This shaft is fitted with a gear 70 engaging the gear 15 which drives the spindle, and with a worm 71 engaging the gear 43 that drives the shaft 41. All these gears together with the worm are removable and may be changed as occasion requires for varying or changing the speed of the parts opreated by them. The shaft 68 has on the end thereof a sprocket gear 72. This gear is preferably operated by an electric motor 73 contained within the chamber of the body section 2 of the machine. The driving shaft of this motor is fitted with a sprocket wheel 74 which is connected to the gear 72 by a sprocket chain 75.

In the operation of the machine the work will be run onto the spindle 9 and curled thereon as the spindle is turned. To assist in feeding the work onto the spindle a guide 76 is preferably employed adjustably fixed to the side of the frame. As the work is curled upon the spindle it is displaced thereon in an endwise direction as before explained, thereby producing at determinate intervals a piece or end 18 extending beyond the outer end of the spindle and lying within the head of the chute. This end as formed is cut off at determinate intervals by the knife. The knife is operated by means of the spring acting as an elastic member and releasable when distorted to operate the knife.

The knife is normally held against rotation by the finger 56 normally held to engage the edge 60 on the collar 32 carried by the shaft which bears the knife. As explained above, one end of the spring or elastic member is secured to the normally stationary collar 32, while the other end of the spring is secured to the collar 48 on the shaft 41. The shaft 41 is kept in continuous rotation from the same mechanism that drives the curling spindle, the shaft rotating simultaneously with the spindle. As the shaft is rotated it will accordingly tend to distort the spring and such distortion is continued and the spring held distorted until the projection 62 on the collar 47 contacts with the pin 63, lifting the finger 55 and thereby through the shaft 52 lifting the stop finger 56 into a disengaging position. Thereupon the collar 32 is released and the full tension of the distorted spring is brought to bear on the collar for rotating the knife and severing the work. The knife is permitted only a single revolution inasmuch as the continued rotation of the shaft 41 carries the projection 62 beyond the pin 63 and thereupon the stop finger 56 is released into its normal engaging position with the collar 32, and bringing up against the edge 60 prevents further rotation of the knife. This operation is continued at determinate intervals as long as the machine is kept running. Of course the arrangement of the parts must be such as to admit of a proper timing, but this is merely a matter of mechanical detail, the construction being such that the timing of the parts and operation of the knife may easily be varied as occasion may require.

Having thus fully described my invention, I claim and desire to secure by Letters Patent of the United States:—

1. In a machine of the type specified, the combination comprising a rotary spindle on which the work is curled, means for rotating the spindle, means for displacing the work along the spindle to project in part beyond the end of the spindle during the rotation thereof, a knife for severing the work thus projecting, an elastic member releasable when distorted to operate said knife at determinate intervals during the operation of the machine, and means for distorting said member at determinate intervals during the operation of the machine.

2. In a machine of the type specified, the combination comprising a rotary spindle on which the work is curled, a driving mechanism for rotating said spindle, means for displacing the work along the spindle to project in part beyond the end of the spindle during the rotation thereof, a knife for severing the work thus projecting, an elastic member releasable when distorted to operate said knife at determinate intervals during the operation of the machine, and means whereby said member will be distorted by said driving mechanism at determinate intervals during the operation of the machine.

3. In a machine of the type specified, the combination comprising a rotary spindle on which the work is curled, means for rotating the spindle, means for displacing the work along the spindle to project in part beyond the end of the spindle during the rotation thereof, a knife for severing the work thus projecting, an elastic member releasable when distorted for operating the knife during the operation of the spindle, and means whereby said member will be distorted during the operation of the spindle.

4. In a machine of the type specified, the combination comprising a rotary spindle on which the work is curled, means for rotating the spindle, means for displacing the work along the spindle to project in part beyond the end of the spindle during the rotation thereof, a knife for severing the work thus projecting, an elastic member for operating the knife when the member is distorted, means whereby said member will be distorted and held distorted during the operation of the machine, and means whereby said member when held distorted will be released to operate said knife.

5. In a machine of the type specified, the combination comprising a rotary spindle on which the work is curled, means for rotating the spindle, means for displacing the work along the spindle to project in part beyond the end of the spindle during the rotation thereof, a knife for severing the work thus projecting, an elastic member for operating the knife when the member is distorted, means active to distort said member during the operation of the spindle and for holding said member in check when distorted, and means whereby said member when held distorted will be released to operate said knife during the operation of the spindle.

6. In a machine of the type specified, the combination comprising a rotary spindle on which the work is curled, means for rotating the spindle, means for displacing the work along the spindle to project in part beyond the end of the spindle during the rotation thereof, a knife for severing the work thus projecting, an elastic member for operating the knife when the member is distorted, means active to distort said member at determinate intervals during the operation of the spindle and hold the same distorted, and means whereby said member when held distorted will be positively released and operate said knife at determinate intervals during the operation of the spindle.

7. In a machine of the type specified, the combination with a work curling and displacing mechanism and driving mechanism therefor, of a knife for severing the work as displaced, a releasable stop, an elastic member operatively connected to the knife and operating when distorted to actuate the knife on the release of the stop, means whereby the elastic member will be distorted by the driving mechanism, and means for releasing the stop.

8. In a machine of the type specified, the combination with a work curling and displacing mechanism and driving mechanism therefor, of a knife for severing the work as displaced, a rotary mounting for the knife, a releasable stop, an elastic member operatively connected to the knife and operating when distorted to actuate the knife on the release of the stop, means whereby the elastic member will be distorted by the driving mechanism, and means for releasing the stop at determinate intervals when the elastic member is distorted.

9. In a machine of the type specified, the combination with a work curling and displacing mechanism and driving mechanism therefor, of a knife for severing the work as displaced, a rotary mechanism bearing said knife, a releasable stop, a rotary shaft operated by said driving mechanism, a coil spring arranged on said shaft and connected thereto and to said rotary mechanism bearing the knife and means for releasing the stop at determinate intervals.

10. In a machine of the type specified, the combination with a work curling and displacing mechanism and driving mechanism therefor, of a knife for severing the work as displaced, a rotary mechanism bearing said knife, a releasable stop, a rotary shaft operated by said driving mechanism, a coil spring arranged on said shaft and connected respectively thereto and to said rotary mechanism bearing the knife, and means operated by the shaft for positively releasing said stop at determinate intervals during the rotation of the shaft.

WILLIAM P. McGRAW.